(12) United States Patent
Kitai et al.

(10) Patent No.: US 8,970,931 B2
(45) Date of Patent: Mar. 3, 2015

(54) IMAGE READING DEVICE EMPLOYING CALIBRATION PLATE, APPARATUS INCLUDING IMAGE READING DEVICE, IMAGE READING CONTROLLING METHOD, AND RECORDING MEDIUM STORING IMAGE READING CONTROL PROGRAM

(71) Applicants: Tadashi Kitai, Kanagawa (JP); Hitomi Kaneko, Saitama (JP); Hiroyoshi Ishizaki, Kanagawa (JP); Keiji Kojima, Kanagawa (JP); Hiroyuki Kawamoto, Kanagawa (JP); Hideyo Makino, Tokyo (JP)

(72) Inventors: Tadashi Kitai, Kanagawa (JP); Hitomi Kaneko, Saitama (JP); Hiroyoshi Ishizaki, Kanagawa (JP); Keiji Kojima, Kanagawa (JP); Hiroyuki Kawamoto, Kanagawa (JP); Hideyo Makino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 13/792,601

(22) Filed: Mar. 11, 2013

(65) Prior Publication Data
US 2013/0250378 A1 Sep. 26, 2013

(30) Foreign Application Priority Data

Mar. 22, 2012 (JP) ................................. 2012-065258
Dec. 27, 2012 (JP) ................................. 2012-285901

(51) Int. Cl.
*H04N 1/46* (2006.01)
*H04N 1/00* (2006.01)

(52) U.S. Cl.
CPC ....... *H04N 1/00023* (2013.01); *H04N 1/00002* (2013.01)
USPC .............................. 358/504; 358/1.9; 358/518

(58) Field of Classification Search
CPC .......... H04N 1/00002; H04N 1/00007; H04N 1/0013; H04N 1/00015; H04N 1/00018; H04N 1/00023; H04N 1/00034; H04N 1/00045; H04N 1/00082; H04N 1/00087; H04N 1/60; H04N 1/6033; H04N 1/6044; G06K 15/027; G06K 15/1878
USPC ........... 358/1.1, 1.9, 400, 401, 406, 500, 501, 358/504, 518, 519
See application file for complete search history.

(56) References Cited

U.S. PATENT DOCUMENTS

2007/0216962 A1    9/2007  Inage
2011/0292478 A1*  12/2011  Ishii .............................. 358/518
2012/0044540 A1*   2/2012  Dalal et al. .................... 358/1.18

FOREIGN PATENT DOCUMENTS

| JP | 2001-174937 | 8/2001 |
|---|---|---|
| JP | 2006-047127 | 2/2006 |
| JP | 2007-251797 | 9/2007 |
| JP | 2007-258973 | 10/2007 |
| JP | 2010-114498 | 5/2010 |

* cited by examiner

*Primary Examiner* — Thomas D Lee
(74) *Attorney, Agent, or Firm* — Cooper & Dunham LLP (57) ABSTRACT

An image reading device includes an imaging device including a plurality of imaging elements, a color measuring unit that detects color of an object at a color measurement area, a calibration plate having a surface on which a plurality of color patches is formed, and a processor that causes the color measuring unit to read the plurality of color patches while changing a relative position between the plurality of color patches and the plurality of imaging elements to output color measurement results of the plurality of color patches, and generates a set of reference values for the plurality of color patches based on the color measurement results of the plurality of colors. The set of reference values are compared with the reading results of the plurality of color patches to generate a set of correction values for correcting the reading results of the plurality of color patches.

12 Claims, 10 Drawing Sheets

IMAGE READING DEVICE EMPLOYING CALIBRATION PLATE, APPARATUS INCLUDING IMAGE READING DEVICE, IMAGE READING CONTROLLING METHOD, AND RECORDING MEDIUM STORING IMAGE READING CONTROL PROGRAM

CROSS-REFERENCE TO RELATED APPLICATIONS

This patent application is based on and claims priority pursuant to 35 U.S.C. §119 to Japanese Patent Application Nos. 2012-065258, filed on Mar. 22, 2012, and 2012-285901, filed on Dec. 27, 2012, in the Japan Patent Office, the entire disclosure of which is hereby incorporated by reference herein.

BACKGROUND

1 Field of the Invention

The present invention generally relates to an image reading device, an apparatus including the image reading device, an image reading control method, and a recording medium storing an image reading control program.

2. Description of the Related Art

With the increased needs for electronic data, various image processing apparatuses are widely used such as printers, facsimiles, scanners, copiers, or multifunctional apparatuses capable of performing a plurality of image processing functions.

Of the plurality of image processing functions, the function of image reading, which may be performed by the scanner, is carried out using an optical sensor that converts optical information read from an image to an electric signal. The optical sensor needs to be regularly calibrated, such that the tone of the image subjected for reading, matches the tone of 5 image data generated by reading the image. For example, a value read from a measurement pattern printed on a recording sheet is compared with a reference value to correct the reading characteristics of the optical sensor.

In one example, when the optical sensor is implemented as a line sensor in which a plurality of optical sensors are arranged in a sub-scanning direction, the line sensor may be calibrated as described in Japanese Patent Application Publication No. 2010-114498-A. In an image forming apparatus described in the Japanese Patent Application Publication No. 2010-114498-A, a calibrator having a polygonal shape, which is rotatable in the backside of a recording sheet, is provided at a reading position to be read by the sensor in a sheet transfer path. The sensor is calibrated when there is no recording sheet being transferred in the sheet transfer path.

SUMMARY

The calibration technique described in the Japanese Patent Application Publication No. 2010-114498-A requires complicated processing, such as printing of a measurement pattern, reading the measurement pattern, processing the read measurement pattern, comparing the read measurement pattern with a reference value. Further, to keep a sufficient level of reading accuracy, color tones of each one of the respective surfaces of the calibrator need to be uniform over relatively a wide area reading area of the line sensor.

In view of the above, one object according to one embodiment of the present invention is to provide an image reading device having an optical sensor that can be easily calibrated in terms of structure and control process, and a method of controlling the process of calibrating an optical sensor.

BRIEF DESCRIPTION OF THE DRAWINGS

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Figure 1:
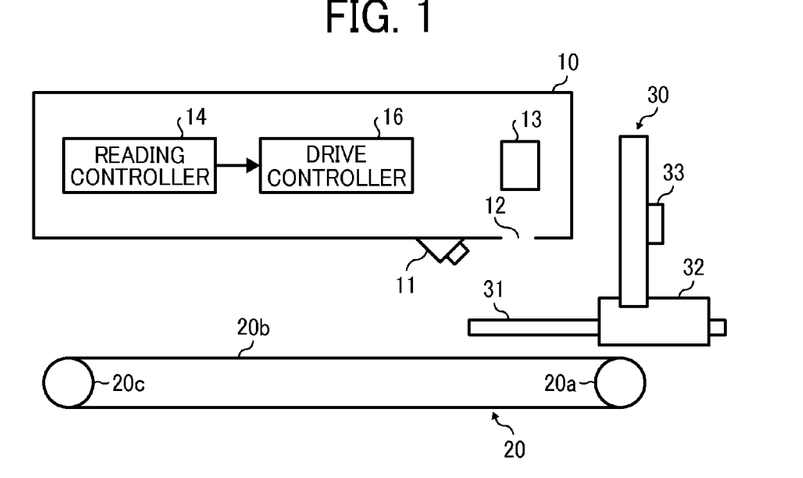
FIG. 1 is a schematic block diagram illustrating a side view of an image reading device, according to an example embodiment of the present invention.
Figure 2:
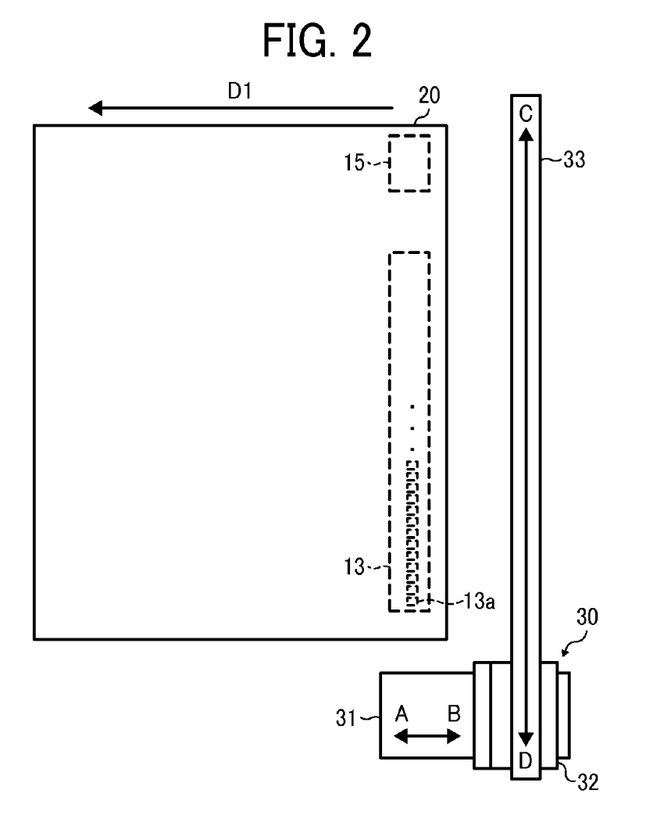
FIG. 2 is a schematic diagram illustrating a top view of the image reading device of FIG. 1.

FIG. 1 is a side view illustrating a structure of an image reading device 1 according to an example embodiment of the present invention. FIG. 2 is a top plan view illustrating the structure of the image reading device 1. As illustrated in FIG. 1, the image reading device 1 includes a light source 11, a reading window 12, a reader 10 including a line sensor 13, a reading controller 14, and a drive controller 16, a transfer device 20, and a calibrator 30 that calibrates the line sensor 13 of the reader 10. As described below referring to FIG. 16, the image reading device 1 reads a surface of a printed image output from the outside apparatus, which is conveyed by the transfer device 20 to a position below the reading window 12. As illustrated in FIG. 2, the reader 10 further includes a color measuring unit 15.

The reader 10 may be implemented by a scanner engine, which reads a surface of the printed sheet being transferred by the transfer device 20. The light source 11 irradiates light onto the surface of the printed sheet being transferred. The light irradiated by the light source 11 is reflected by the printed surface toward the line sensor 13 via the reading window 12. The line sensor 13 detects incident light reflected via the reading window 12, converts the detected light level to an electric signal, and outputs the electric signal that reflects the detected light level to the reading controller 14. The line sensor 13 thus functions as an imaging device.

The reading controller 14 controls the reader 10, as well as entire system of the image reading device 1. The reading controller 14 generates image data based on the electric signal input from the line sensor 13 to perform reading operation. The drive controller 16 controls movements of the calibrator 30 according to the instructions received from the reading controller 14, such that each part in the calibrator 30 moves under control of the reading controller 14.

As illustrated in FIG. 2, in this example, the line sensor 13 is an optical sensor in which a plurality of imaging elements 13a are arranged in a direction orthogonal to a sheet transfer direction D. The values output by the imaging elements 13a respectively correspond to the pixels of the output image data. With these imaging elements 13a, the line sensor 13 reads the surface of the printed sheet, line by line, in the main scanning direction.

The image reading device 1 may be operated in two modes, that is, an operation mode and a calibration mode. In the operation mode, the image reading device 1 outputs 24-bit RGB image data including 8 bits of read (R) image data, 8 bits of green (G) image data, and 8 bits of blue (B) image data.

In the calibration mode, the image reading device 1 outputs image data that is greater in number of bits than the 24-bit RGB image data that is output in the operation mode. For example, 30-bit RGB image data including 10 bits of R image data, 10 bits of G image data, and 10 bits of B image data may be output. With the increased number of bits, calibration may be performed with improved accuracy.

The color measuring unit 15 is implemented by an optical sensor, which outputs an electric signal based on the level of the incident light reflected from a subject for reading at the reading position. The optical sensor of the color measuring unit 15 is capable of detecting light with improved accuracy, than the optical sensor of the line sensor 13. The color measuring unit 15 divides the incident light by wavelength range to detect the light level for each wavelength range, and outputs the color of the incident light in the form of detection signal that corresponds to the color detected at the reading position. The detection signal output from the color measuring unit 15 is input to the reading controller 14.

The transfer device 20 includes a drive roller 20a that is rotatably driven by a motor, an endless belt 20b wound around the drive roller 20a, and a driven roller 20c that is rotated with rotation of the endless belt 20b. The endless belt 20b is also wound around the driven roller 20c, such that the endless belt 20b is stretched over the rollers 20a and 20c. The printed sheet output from the outside apparatus is carried by the endless belt 20b in the sub-scanning direction with the rotation of the endless belt 20b.

The calibrator 30 includes a calibration plate 31 to be read in the calibration mode, and a drive mechanism that moves the calibration plate 31 in a whole range of the line sensor 13 as well as a range including the reading position of the color measuring unit 15. As illustrated in FIGS. 1 and 2, the calibrator 30 includes a calibration plate holder 32 that holds the calibration plate 31, and a guide rail 33 that guides movements of the calibration plate holder 32 in the direction between the position C and the position D in FIG. 2, that is, in the main scanning direction.

The calibration plate holder 32 supports the calibration plate 31 in a manner such that the calibration plate 31 can be moved in the direction between the position A and the position B in FIG. 2, that is, in the sub-scanning direction. The calibration plate 31 is formed with a plurality of calibration color patches to be read by the line sensor 13, for example, in the calibration process. As the calibration plate holder 32 moves the calibration plate 31 in the sub-scanning direction, all the color patches formed on the calibration plate 31 can be read by the line sensor 13.

Figure 3:
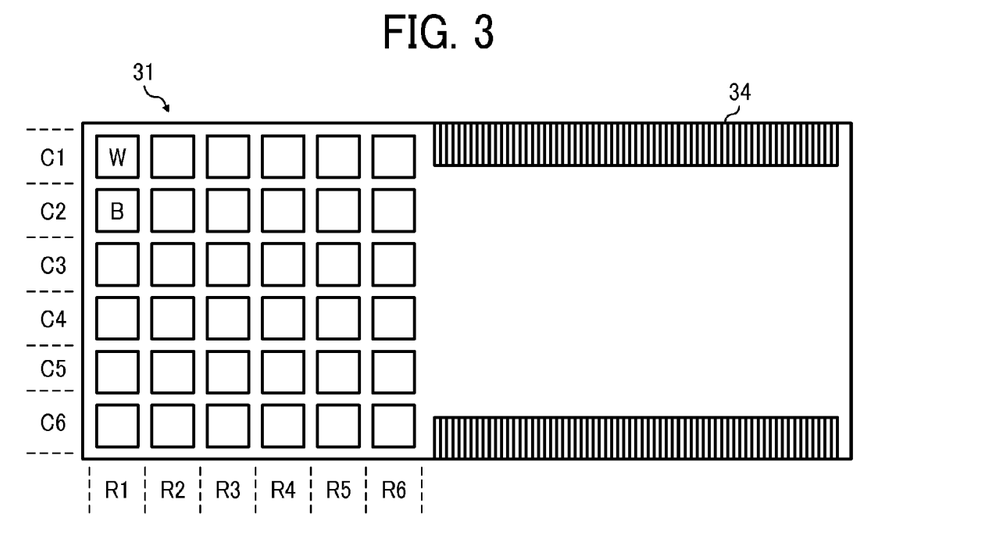
FIG. 3 is a schematic diagram illustrating a surface of a calibration plate provided in the image reading device of FIG. 1.

Referring now to FIG. 3, a configuration of the calibration plate 31 is explained according to an example embodiment of the present invention. As illustrated in FIG. 3, the calibration plate 31 has an upper surface formed with the total of 36 color patches, arranged in six rows and six columns. Of the 36 color patches, the patch arranged in the first row R1 and the first column C1 has the white color, as denoted by "W" in FIG. 3. The patch arranged in the first row R1 and the second column C2 has the black color, as denoted by "B" in FIG. 3. The rest of color patches, that is, the other 34 color patches respectively have different colors other than the white and the black.

The white color patch and the black color patch may be used to correct the color tone during the calibration process. The white color patch and the black color patch may also be used to apply shading correction. The color patches are arranged in distance from one another, so that the adjacent color patches are separated by a space. In order to make easier to distinguish between the different patches, the space between the color patches may be colored. For example, the space between the patches may be colored with a background color of the calibration plate 31. Alternatively, the space between the patches may be colored with a specific color that is decided based on the colors of the adjacent patches, such that the boundary defining each color patch will be clear.

Figure 15A:
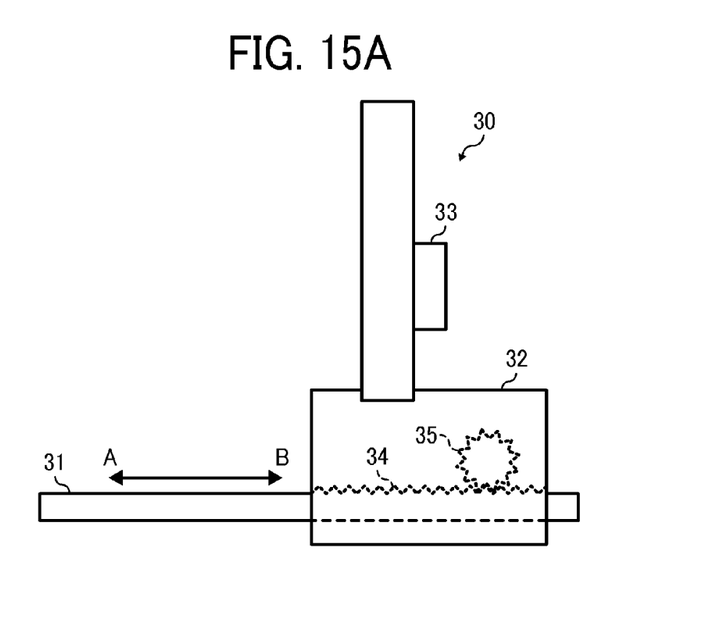
FIGS. 15A and 15B are an illustration for explaining operation of controlling the position of the calibration plate of FIG. 3.

As illustrated in FIG. 15A, the calibration plate 31 has a gear 34, which is provided at a position that can be supported by the calibration plate holder 32. FIG. 15A illustrates an enlarged section of the calibrator 30 of FIG. 1. Referring to FIG. 15A, the calibration plate holder 32 has a gear 35 in its inside, such as in its inner wall. The gear 34 of the calibration plate 31 is engaged with the gear 35 provided at the calibration plate holder 32. As the gear 35 of the calibration plate holder 32 rotates, the calibration plate 31 that is engaged with the gear 35 moves in the sub-scanning direction.

Figure 15B:
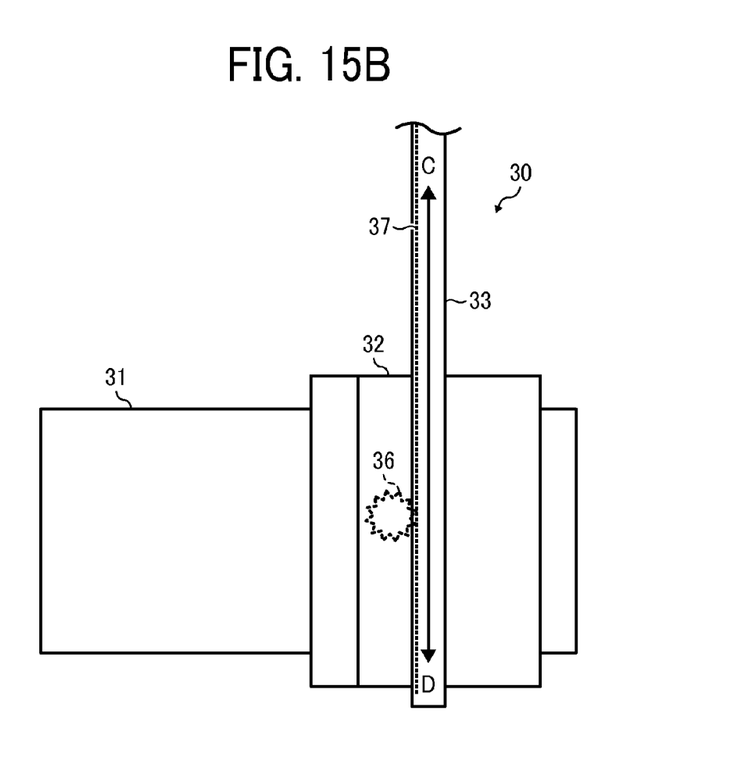

The guide rail 33 is provided with a gear, which is engaged with a gear of the calibration plate holder 32. FIG. 15B illustrates an enlarged section of the calibrator 30 of FIG. 2. Referring to FIG. 15B, the calibration plate holder 32 has a gear 36, which faces the guide rail 33 and is engaged with a gear 37 provided at the guide rail 33. The movement of the calibration plate holder 32 along the guide rail 33, or the movement of the calibration plate 31 by the calibration plate holder 32, may be controlled by the reading controller 14. More specifically, according to the instructions received from the reading controller 14, the drive controller 16 drives the gears 35 and 36 of the calibration plate holder 32, thus causing the calibration plate 31 to move through the calibration plate holder 32 in the main scanning direction and the sub-scanning direction.

Figure 4:
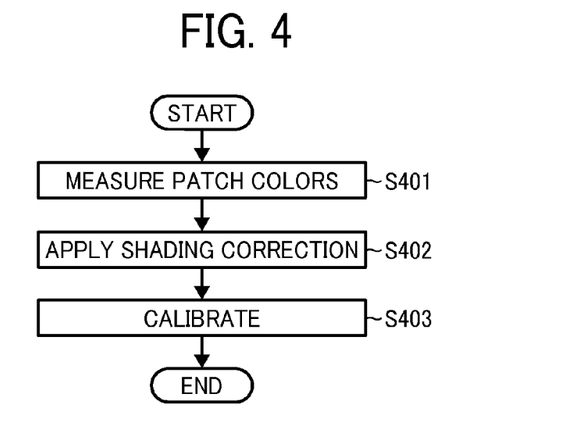
FIG. 4 is a flowchart illustrating operation of calibrating a line sensor provided in the image reading device of FIG. 1, performed by the image reading device of FIG. 1, according to an example embodiment of the present invention.

Referring now to FIG. 4, operation of calibrating the line sensor 13, performed by the image reading device 1 operating in the calibration mode, is explained according to an example embodiment of the present invention.

Figure 5:
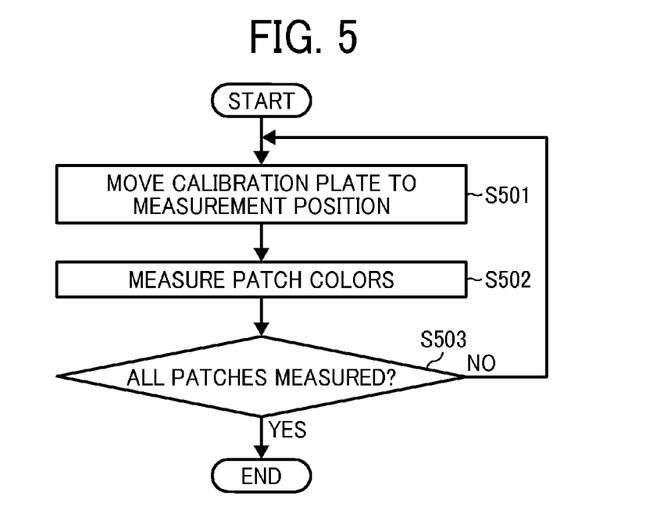
FIG. 5 is a flowchart illustrating operation of measuring colors of patches formed on the calibration plate of FIG. 3, performed by the image reading device of FIG. 1, according to an example embodiment of the present invention.

At S401, the image reading device 1 reads patch colors formed on the calibration plate 31. More specifically, the color measuring unit 15 reads the patches formed on the calibration plate 31 to generate reference values to be used for calibration. Referring to FIG. 5, operation of measuring the patch colors is explained according to an example embodiment of the present invention.

At S501, the reading controller 14 controls the drive controller 16 to move the calibration plate holder 32, so that the calibration plate 31 is moved to the reading position that can be read by the color measuring unit 15.

As illustrated in FIG. 2, the color measuring unit 15 is arranged in a line extending from the direction along which the plurality of imaging elements 13a are arranged, that is, the sub-scanning direction of the line sensor 13. Accordingly, by just moving the calibration plate holder 32 of the calibrator 30 along the guide rail 33, the calibration plate 31 is moved to the reading position of the color measuring unit 15. This structure simplifies the process of controlling the movements of the calibration plate 31.

Figure 6:
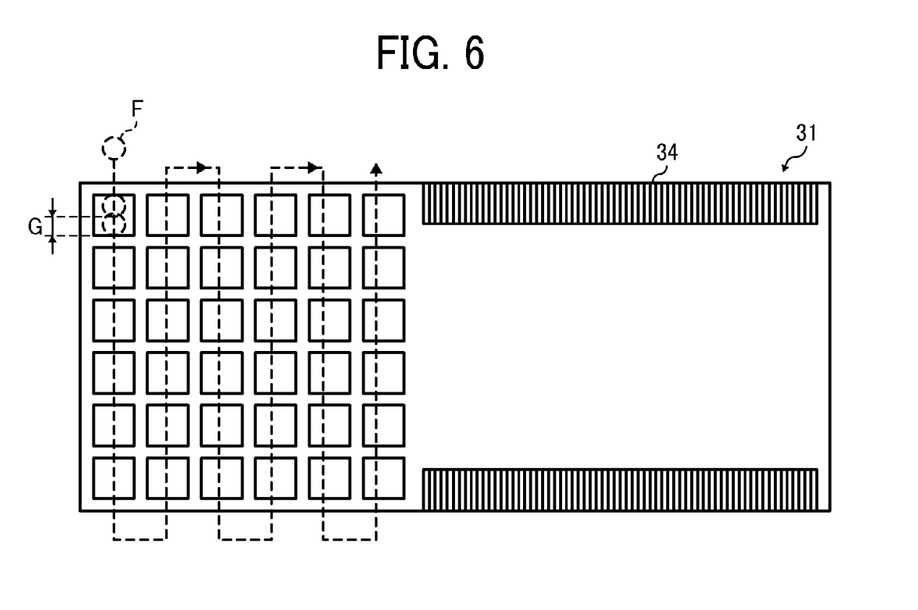
FIG. 6 is an illustration for explaining the positional relationship between the calibration plate of FIG. 3 and a reading position to be read by the line sensor of the image reading device of FIG 1, according to an example embodiment of the present invention.

FIG. 6 illustrates the relationship between the reading position of the color measuring unit 15 and the position of the calibration plate 31. In FIG. 6, a position F indicated by the doted circle indicates a color measurement area of the calibration plate 31 that can be measured by the color measuring unit 15. The position F may be referred to as the reading position, or the color measurement position or area.

After the calibration plate 31 is moved to the reading position indicated by F in FIG. 6, at S502, the reading controller 14 controls the color measuring unit 15 to measure patch colors while continuously controlling the drive controller 16 to move the calibration plate holder 32 and the calibration plate 31.

Still referring to FIG. 6, the reading controller 14 moves the calibration plate holder 32 together with the calibration plate 31, such that the reading position of the calibration plate 31 to be measured by the color measuring unit 15 moves in the path indicated by the doted arrow. While the calibration plate holder 32 and the calibration plate 31 are being moved, the color measuring unit 15 measures the colors of the patches formed on the calibration plate 31 at the reading position. As indicated by the doted arrow, the odd rows R1, R3, and R5 of the patches are measured in the order from C1 to C6, and the even rows R2, R4, and R6 of the patches are measured in the order from C6 to C1.

Further, it may take some time for the color measuring unit 15 to obtain the color measurements. Accordingly, the reading controller 14 determines a speed of the movements of the calibration plate holder 32, such that a time period required for the spot indicated by the measurement area F to move through the inside of one patch (indicated by the time period "G" in FIG. 6) is equal to or greater than a time period for the color measuring unit 15 to complete reading the color of one patch. Based on the determined speed, the reading controller 14 controls driving of the calibration plate holder 32 such that the calibration plate holder 32 moves in the main scanning direction along the guide rail 33 with the determined speed. In this example, the time period required for color measurements, that is, the color measurement time period, may depend on the sensitivity of the color measuring unit 15. More specifically, the sensitivity of the color measuring unit 15 is set such that the measurement accuracy is improved while the noise level is suppressed. While taking into account the sensitivity of the color measuring unit 15, the color measurement time period is previously determined as a time period for the color measuring unit 15 to complete measurements of patch colors for one patch of the calibration plate 31. As the speed of driving the calibration plate holder 32 is previously determined based on the color measurement time period, the color measuring unit 15 is able to measure patch colors without requiring the calibration plate 31 to stop.

The reading controller 14 repeats measurement of patch colors of the patches formed on the calibration plate 31, while moving the calibration plate 31 along the path indicated by the dotted arrow as illustrated in FIG. 6. More specifically, at S503, the reading controller 14 determines whether all of the patches are measured. When it is determined that all of the patches are not measured ("NO" at S503), the operation returns to S501 and S502 to measure the colors of the other patches. When it is determined that all of the patches are measured ("YES" at S503), the operation ends.

The color measurements obtained by measuring the colors of the patches are stored in a memory as a set of reference values to be used for calibration process. The reading controller 14 may access the memory at any desired time to obtain the reference values.

Referring back to FIG. 4, the operation proceeds to 5402 to apply shading correction, which will be described below referring to FIG. 7.

At S701, the reading controller 14 switches the output mode of the line sensor 13 to a shading correction mode to start shading correction. For example, it is assumed that, at S401, the output mode of the line sensor 13 is set to a measurement mode. Under the shading correction mode, the line sensor 13 outputs 10-bit data for each color of R, G and B, per one image pixel, as read image data. Further, in the shading correction mode, the reading controller 14 adds "0" data to the upper 6 bits, respectively, to 10-bit R data, 10-bit G data, and 10-bit B data that are output from the line sensor 13, to process as 16-bit R data, 16-bit G data, and 16-bit G data. With this processing, a format of the read data is made applicable to a data format that can be processed by the general-purpose information processing apparatus, such as the general-purpose computer.

After the shading correction is started, the operation proceeds to S702. At S702, the reading controller 14 controls the calibration plate holder 32 and the line sensor 13 such that the line sensor 13 can read the color patches arranged in the first row R1 of the calibration plate 31.

Figure 8:
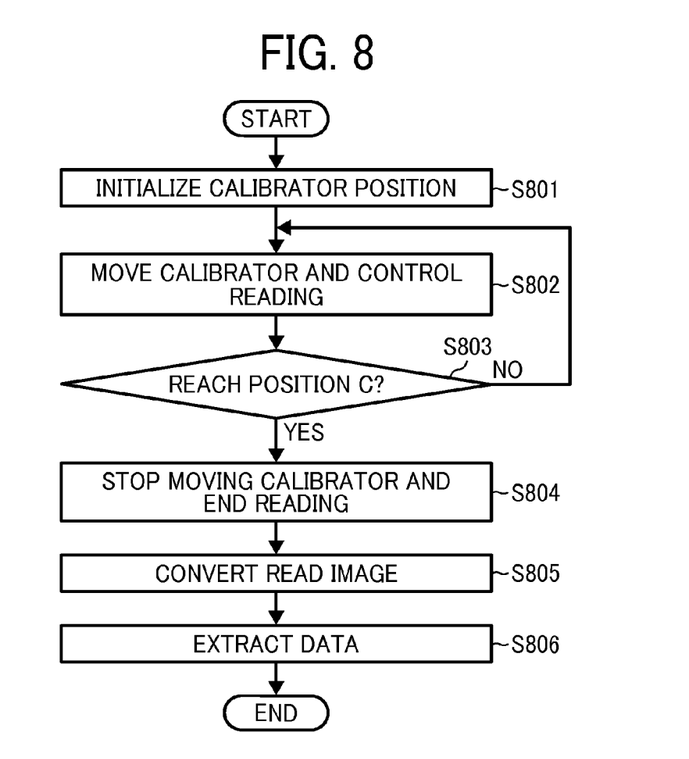
FIG. 8 is a flowchart illustrating operation of reading data of one line, performed by the image reading device of FIG. 1 during the shading correction operation of FIG. 7, according to an example embodiment of the present invention.

Referring now to FIG. 8, operation of reading one line (one row) of color patches, which is performed at S702, is explained according to an example embodiment of the present invention.

At S801, the reading controller 14 brings the position of the calibration plate 31 to the initial position. More specifically, the reading controller 14 moves the calibration plate 31 to a position along a line extending from the reading position in the sub-scanning direction, such that the first row RI of the calibration plate 31 can be read by the line sensor 13, Referring now to FIG. 12, operation of initializing the position of the calibration plate 31, performed at 5801 of FIG. 8, is explained according to an example embodiment of the present invention.

Figure 12:
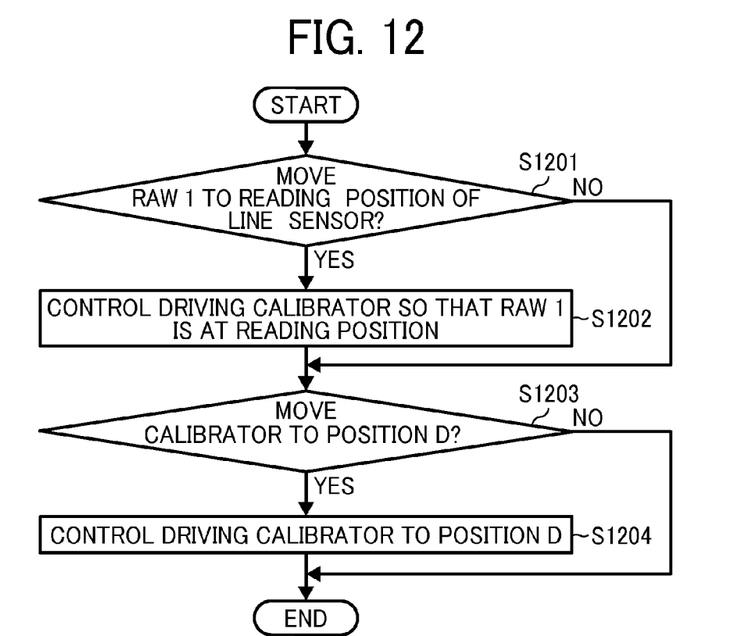
FIG. 12 is a flowchart illustrating operation of initializing the position of the calibration plate of FIG. 3, according to an example embodiment of the present invention.

At S1201, the reading controller 14 checks whether the first row R1 of the patches formed on the calibration plate 31 is located at the reading position of the line sensor 13 in the sub-scanning direction. When it is determined that the first row R1 of the patches needs to be moved to the reading position of the line sensor 13 in the sub-scanning direction, ("YES" at S1201), the operation proceeds to 1202. When it is determined that the first row R1 of the patches does not need to move to the reading position in the sub-scanning direction ("NO" at S1201), the operation proceeds to S1203.

At S1202, the reading controller 14 controls the gear 35 of the calibration plate holder 32 to move the calibration plate 31 in the sub-scanning direction, so that the first row R1 of the patch formed on the calibration plate 31 is moved to the reading position of the line sensor 13 in the sub-scanning direction.

At S1203, the reading controller 14 checks whether the calibration plate 31 of the calibrator 30 is located at the position D of FIG. 2 in the main scanning direction. When the calibration plate 31 is not at the position D such that the calibration plate 31 of the calibrator 30 needs to be moved to the position D ("YES" at S1203), the operation proceeds to S1204. When the calibration plate 31 is at the position D such that the calibration plate 31 does not need to be moved to the position D ("NO" at S1203), the operation ends.

At S1204, the reading controller 14 controls the gear 36 of the calibration plate holder 32, via the drive controller 16, to move the calibration plate 31 of the calibrator 30 along the guide rail 33 to the position D. Accordingly, the calibration plate 31 is moved to the initial position, that is, at the reading position at which the line sensor 31 can read.

At S802, the reading controller 14 controls to move the calibration plate holder 32 along the guide rail 33, from the position D to the position C as illustrated in FIG. 1. At the same time, the reading controller 14 controls the line sensor 13 to read the color patches formed on the calibration plate 31. More specifically, the reading controller 14 performs reading operation in a substantially similar manner as the reading controller 14 reads image data, such as, from the printed sheet. In the reading process, the reading controller 14 reads image data of one line in the main scanning direction, line by line in the sub-scanning direction, to form image data of one document, i.e., one printed sheet.

At S803, the reading controller 14 determines whether the calibration plate 31 of the calibrator 30 reaches the position C in FIG. 1. When it is determined that the calibration plate 31 of the calibrator 30 does not reach the position C ("NO" at S803), the operation repeats S802. In this manner, image data is read from one row of the calibration plate 31 while the calibration plate 31 of the calibrator 30 is moved to the position C.

When it is determined that the calibration plate 31 of the calibrator 30 reaches the position C ("YES" at S803), the reading controller 14 ends control of movements of the calibration plate holder 32 as well as ends control of reading using the line sensor 13. At this time, it is assumed that the image data of FIG. 9A is generated, as the line sensor 13 reads one row of the calibration plate 31 while moving the calibration plate 31 from the position D to the position C.

Figure 9A:
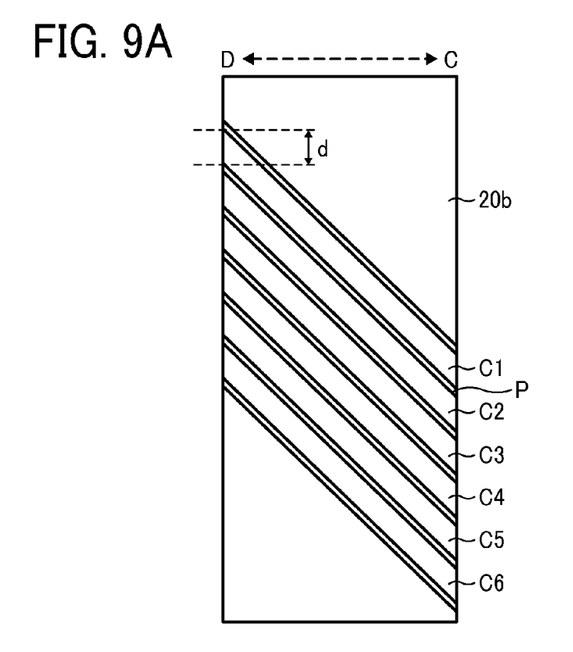
FIG. 9A is an illustration of example read image data, obtained by the image reading device of FIG. 1, for the odd rows of color patches formed on the calibration plate of FIG. 3.

Referring to FIG. 9A, the image data can be expressed as a diagonal pattern including the colors of the patches (C1 to C6), the background color of the calibration plate 31, and the spaces "P" between the patches, which is formed on the read image of the transfer belt 20b of 2 5 the transfer device 20. Assuming that the moving speed of the calibration plate 31 of the calibrator 30 in the main scanning direction and the moving speed of the transfer belt 20b of the transfer device 20 are equal, the angle of the diagonal pattern is 45 degrees with respect to the main scanning direction and the sub-scanning direction. On the other hand, when the moving speed of the calibration plate 31 of the calibrator 30 in the main scanning direction is greater than the moving speed of the transfer belt 20b, the angle between the diagonal pattern and the main scanning direction becomes larger than 45 degrees. When the moving speed of the calibration plate 31 of the calibrator 30 in the main scanning direction is less than the moving speed of the transfer belt 20b, the angle between the diagonal pattern and the main scanning direction becomes less than 45 degrees. In the following examples, the main scanning direction is referred to as the X direction, and the sub-scanning direction is referred to as the Y direction.

Figure 10:
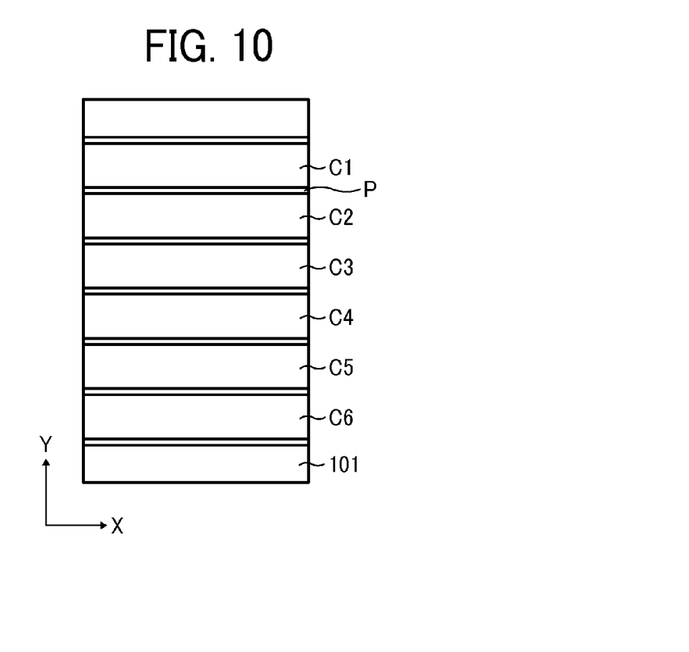
FIG. 10 is an illustration of example image data converted from the read image data of FIG. 9A or 9B.

As the read image data of FIG. 9A is obtained, at S805, the reading controller 14 converts the read image data to converted image data of FIG. 10. Through conversion, any portion corresponding to the transfer belt 20b that is not used for image processing is deleted. Further, the angle of the diagonal pattern is corrected such that the pattern is made orthogonal with the Y direction. In the image data of FIG. 10, the pixels in the X direction correspond to the reading results of the imaging elements 13a of the line sensor 13, and the pixels in the Y direction correspond to the temporal change of the reading results of the imaging elements 13a of the line sensor 13.

Figure 11:
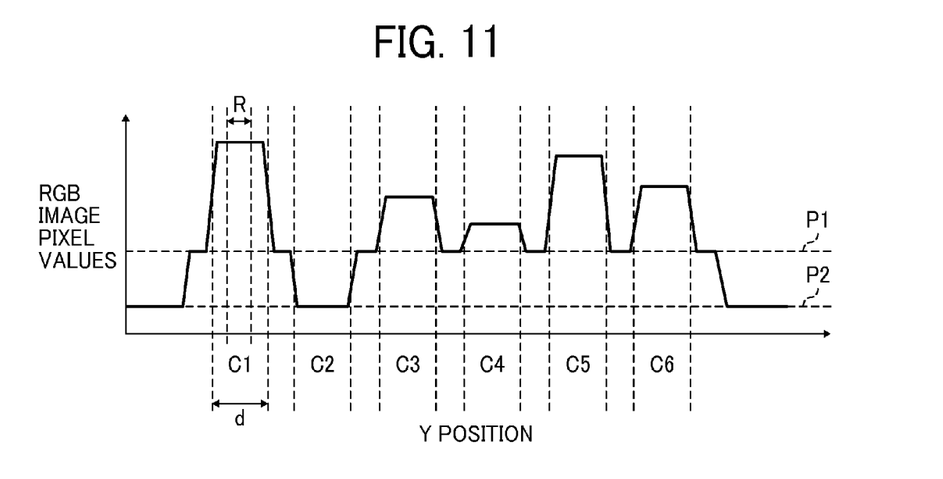
FIG. 11 is an illustration for explaining operation of extracting pixel values from the converted image data of FIG. 10 as a reading result of the line sensor.

Referring back to FIG. 8, at S806, the reading controller 14 extracts data from the converted image data of FIG. 10, for shading correction. As described above, the pixels in the Y direction, which correspond to the temporal change of the reading results of the imaging elements 13a of the line sensor 13, reflect the pixels arranged in the sub-scanning direction. FIG. 11 illustrates the change in read pixel values for one line in the Y direction.

As illustrated in FIG. 11, the reading results of the imaging elements 13a of the line sensor 13 correspond to the pixel values of the patch colors respectively obtained from the columns C1 to C6 in the first row R1, in the Y direction, that is, the sub-scanning direction. Since the white color and the black color are used for shading correction, at S806, the image reading controller 14 extracts the pixel value of the white color patch positioned at R1 and C1, and the pixel value of the black color patch position at R1 and C2.

For simplicity, the graph of FIG. 11 shows the change in pixel values of the patches in the first row R1. In this example, the reading controller 14 extracts the pixel values of the patches for the first and second columns C1 and C2, throughout all rows R1 to R6 in the sub-scanning direction, from the image data of FIG. 10. As described above, the image data of FIG. 10 includes the pixel values obtained by the imaging elements 13a of the line sensor 13.

Referring to FIG. 11, in order to obtain the pixel value of the patch color, the reading controller 14 detects a range "d" to be extracted for each patch of FIG. 11, using the pixel value "P1" corresponding to the space "P" (FIG. 10) that defines the patch. The reading controller 14 extracts a center section "R" of the range "d", and calculates the average value of the pixel values extracted from the center section "R" as the pixel value of the patch color.

As described above, the pixel value "P1" may be the background color of the calibration plate 31. For example, the pixel value "P1" corresponding to the space "P" between the patches may be previously registered in the reading controller 14. The reading controller 14 compares the registered pixel value "P1" with the read pixel value to detect the space "P" between the patches, and determines that the portion other than the detected space "P" indicates the pixel values of the patch colors to extract that portion as the range "d" to be read.

Alternatively, each space "P" between the patches is assigned with a color that makes the boundary between the patches clear. Accordingly, the reading controller 14 may detect the space "P" between the patches, by determining whether there is any sudden change in pixel values. The center section "R" of the range "d" to be extracted may be set so as to have the range that is 50 percent of the range "d" in the Y direction.

In FIG. 11, the pixel value "P2" corresponds to the black pixel value, or the color of the transfer belt 20b. For example, the reading controller 14 may previously register the pixel value "P2", and uses the pixel value "P2" to detect the black color patch at C2 or to remove the portion corresponding to the transfer belt 20b from the image data of FIG. 9A.

As described above, in this example, the calibration plate 31 has the color patches formed on the surface as illustrated in FIG. 3. The reading controller 14 controls reading the patch colors in a substantially similar manner as the case of reading an image on the printed sheet, to obtain the pixel values of the patch colors. More specifically, in order to read the pixel values of the color patches formed on the calibration plate 31, the positional relationship between the imaging elements 13a of the line sensor 13 and the calibration plate 31, on a two-dimensional plane, is controlled. In one example, the imaging elements 13a of the line sensor 13 is moved with respect to the calibration plate 31. In another example, the calibration plate 31 is moved with respect to the line sensor 13. Controlling the position of the line sensor 13 or the calibration plate 31 can be easily controlled, when compared with the conventional case in which the calibration plate is stopped for each imaging element, or the calibration plate is rotated.

Figure 7:
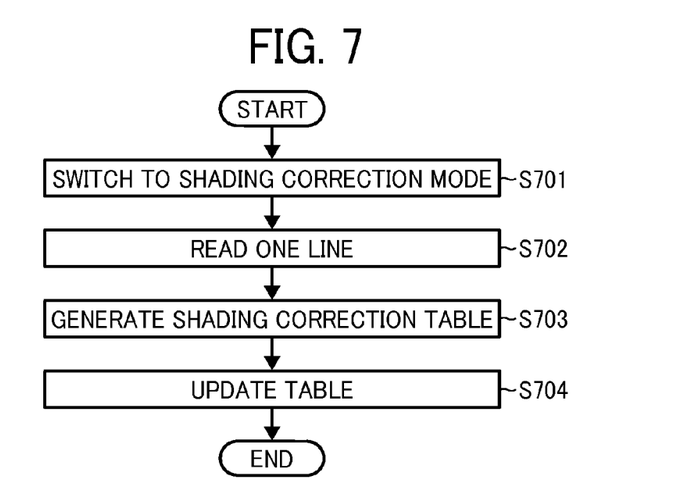
FIG. 7 is a flowchart illustrating operation of applying shading correction, performed by the image reading device of FIG. 1, according to an example embodiment of the present invention.

After completing S702 of reading one line of image data, the operation proceeds to S703 of FIG. 7. The reading controller 14 generates a shading correction table for all of the imaging elements 13a of the line sensor 13, based on the data extracted through the reading process at S702, that is, the reading results of the "white" and "black" color patches of the calibration plate 31. More specifically, at S703, the reading controller 14 generates the shading correction table using any desired shading correction technique, which can convert the pixel values of the reading result to the white or black pixel values.

Figure 13:
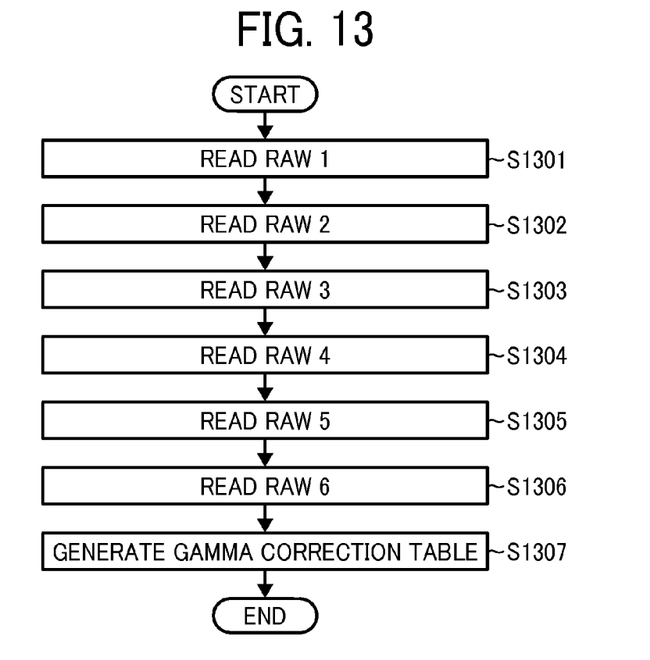
FIG. 13 is a flowchart illustrating operation of calibrating the line sensor, performed by the image reading device of FIG. 1, according to an example embodiment of the present invention.

At S704, the reading controller 14 updates a shading correction table that is previously registered using the shading correction table generated at S703, and the operation of S402 of FIG. 4 ends The operation further proceeds to S403 to perform calibration of the line sensor 13, which is described below referring to FIGS. 13.

At S1301 to S1306, the reading controller 14 controls so that the colors of the patches formed on the calibration plate 31 are read sequentially, from the first row R1 to the sixth row R6, to extract the pixel values of the patch colors. S1301 to S1306 are processed in a substantially similar manner as described above referring to FIG. 8, except for some differences. The differences include that data to be output by the line sensor 13 is 24-bit RGB image data including 8-bit R image data, 8-bit G image data, and 8-bit B image data, and that data extracted at S806 not only includes the pixel values of the first and second columns but also the third to sixth columns.

Further, when reading the pixel values for the odd rows R1, R3, and R5, respectively, at S1301, S1303, and S1305, the reading controller 14 controls such that the calibration plate 31 of the calibrator 30 is moved from the position D to the position C of FIG. 2. When reading the pixel values for the even rows R2, R4, and R6, respectively, at S1302, S1304, and S1306, the reading controller 14 controls such that the calibration plate 31 of the calibrator 30 is moved from the position C to the position D of FIG. 2. Since the reading controller 14 switches the direction of moving the calibrator 30 for the odd row and even row, the patches formed on the calibration plate 31 are read with improved efficiency as indicated by the path shown in FIG. 6.

Figure 14:
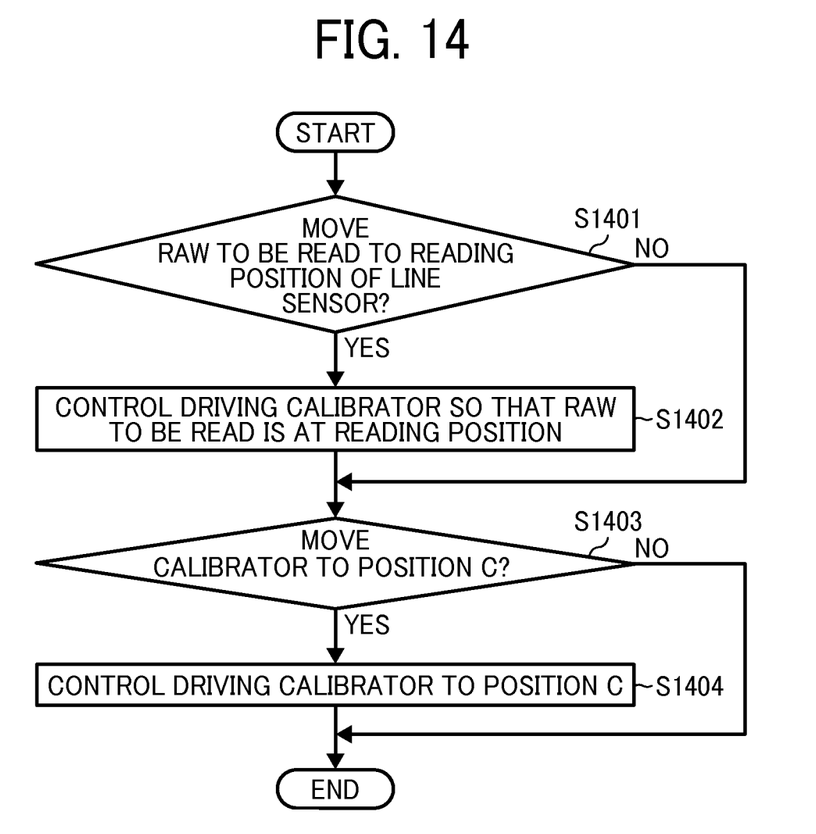
FIG. 14 is a flowchart illustrating operation of initializing the position of the calibration plate of FIG. 3, according to an example embodiment of the present invention.

Referring now to FIG. 14, operation of reading the patch colors for the even rows R2, R4, and R6 is explained while focusing on the differences with respect to operation of reading the patch colors for the odd rows R1, R3, and R5. More specifically, the operation of FIG. 14 corresponds to 5801 of initializing the position of the calibration plate 31.

The operation of FIG. 14 is performed in a substantially similar manner as described above referring to FIG. 12, except that the row to be read at S1401 is the even row R2, R4, or R6, and that the calibration plate 31 of the calibrator 30 is moved from the position C to the position D.

Figure 9B:
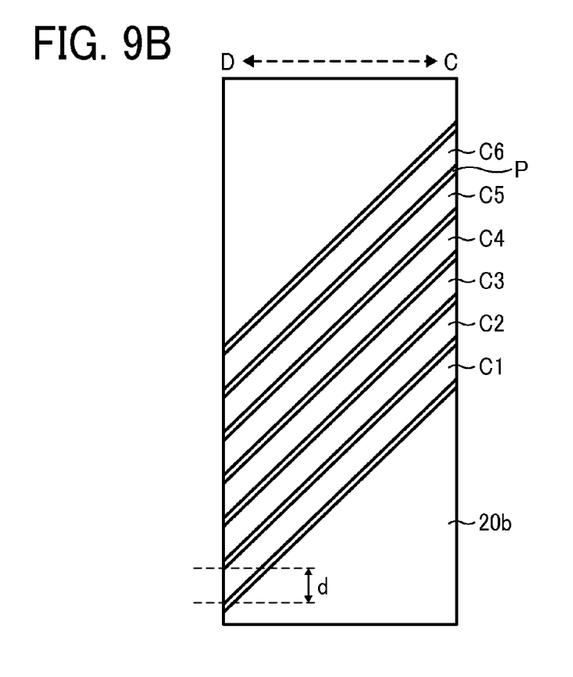
FIG. 9B is an illustration of example read image data, obtained by the image reading device of FIG. 1, for the even rows of color patches formed on the calibration plate of FIG. 3.

Referring back to FIG. 13, through performing S1301 to S1306, the pixel values are extracted from the read image data, which is the reading results of all patches formed on the calibration plate 31, which are respectively obtained by the imaging elements 13a of the line sensor 13. In this example, FIG. 9A illustrates the read image data for the odd rows R1, R3, and R5, and FIG. 9B illustrates the read image data for the even rows R2, R4, and R6. The reading controller 14 applies processing to the read image data of FIG. 9A and the read image data of FIG. 9B, in a substantially similar manner as described above referring to S805 and S806 of FIG. 8.

In the above-described case of S806 of FIG. 8, in the shading correction process at S402, the reading controller 14 extracts the pixel values of only the white and black color patches. In the calibration process at S403, the reading controller 14 extracts the pixel values of the colors of all patches. At S1307, the reading controller 14 compares the pixel values of the patches that are extracted, with the reference values that are generated at S401, to generate a gamma correction table to be used for correcting the pixel values of the read image data, thus correcting color tones of the read image data.

The reference values generated at 5401 may be stored, for example, in a memory such as a recording medium, in an order defined by the arrangement of the color patches. At S1308, the reading controller 14 compares the pixel values obtained by reading the color patches, with the reference values generated for the respective color patches, to generate a gamma correction table that can correct the difference between the read pixel values and the reference values.

In the above-described example of the image reading device 1, through moving the calibration plate 31 of the calibrator 30 along the guide rail 33 in the sub-scanning direction, calibration may be applied to all imaging elements 13a of the line sensor 13. Further, through moving the calibration plate 31 of the calibrator 30, the imaging elements 13a of the line sensor 13 respectively read the color patches formed on the calibration plate 31. Accordingly, it is not necessary to provide a calibration plate having a surface area that corresponds to the image reading area of the imaging elements 13a included in the line sensor 13.

In other words, there is no need to provide the calibration plate having the uniform color tones over the large surface area, thus the structure of the calibrator 30 may be simplified. Further, there is no need to maintain the cleanness of the calibration plate having the large surface area such that the operation cost can be greatly reduced. Further, the size of the calibration plate 31 can be greatly reduced. Accordingly, with the above-described structure and control operation of the image reading device 1, calibration of the optical sensor is made easier.

Moreover, in this example, the color measuring unit 15 measures the colors of the patches to generate the reference values, such that the reference values can reflect the changes in the conditions of the calibration plate 31 that may be observed over time, thus improving the accuracy in calibration process.

For example, for each one of the color patches formed on the calibration plate 31, the pixel value extracted from one specific patch as the reference value of that patch should be the same every time. When there is any change in the extracted pixel value for the same patch, the reading controller 14 determines that there is a stain in the color patch or there is a trouble in the color measuring unit 15. For this reasons, the reading controller 14 preferably stores the reference values generated through operation of FIG. 5 in the memory, even after the calibration process completes.

The reading controller 14 performs operation of FIG. 4 to generate the reference values. The reading controller 14 compares the reference values that are newly generated, with the reference values that are previously stored in the memory, for the respective patches, to generate a comparison result. When the comparison result indicates that the reference values greatly differ, the reading controller 14 may notify of an error based on assumption that there may be a stain in color patch or there may be an error in color measuring unit 15.

The reading controller 14 may be implemented by a combination of hardware and software. For example, the reading controller 14 may be implemented by a hardware structure including a computing device such as a central processing unit (CPU), a volatile memory such as a random access memory (RAM), and a nonvolatile memory such as a read only memory (ROM) and a hard disk drive (HDD). The nonvolatile memory may store various control programs such as the operating system (OS) and application programs. When the program is loaded from the nonvolatile memory onto the RAM, the CPU performs according to the loaded program to function as the reading controller 14.

Figure 16:
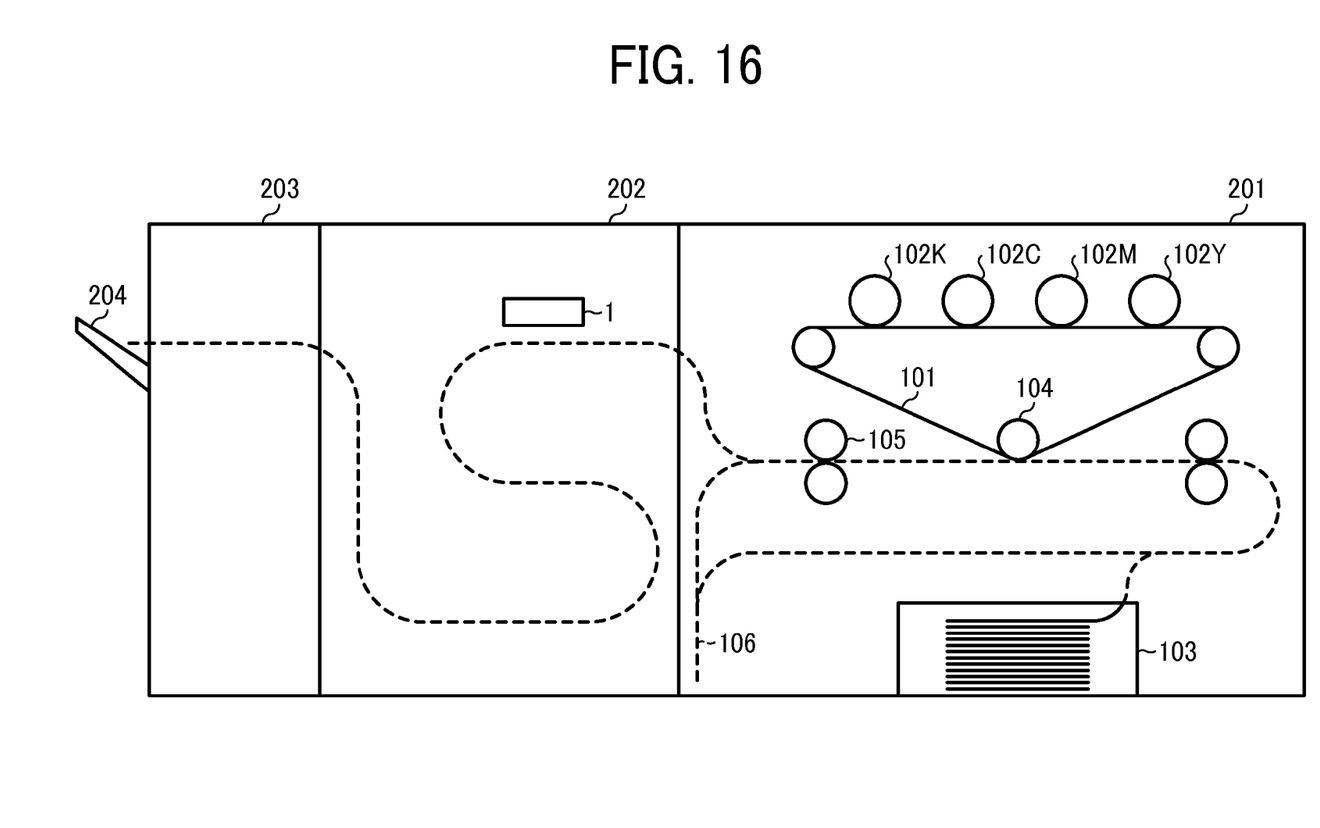
FIG. 16 is a schematic block diagram illustrating a structure of an image inspection system including the image reading device of FIG. 1, according to an example embodiment of the present invention.

In one example, the image reading device 1 as described above may be incorporated in an image inspection apparatus, which reads a printed image formed on the recording sheet that is output from an image forming apparatus to output an inspection result. The inspection result indicates whether the printed image is in good quality. Referring now to FIG. 16, a structure of an image inspection system having the image reading device 1 is explained according to an example embodiment of the present invention.

The image inspection system of FIG. 16 may be implemented by a system including a print engine 201, an inspection apparatus 202, and a stacker 203. The print engine 201 is implemented as the tandem-type image forming device. More specifically, the print engine 201 includes a plurality of photoconductive drums 102Y, 102M, 102C, and 102K (collectively referred to as the photoconductive drum 102), which are disposed side by side along a transfer belt 101 in the direction from the upstream of the sheet transfer direction. The transfer belt 101, which is an endless belt, is an intermediate transfer belt, which is formed with an intermediate transfer image to be transferred onto the recording sheet fed by a sheet feeding tray 103. In operation, the toner images of the respective colors, which are formed on the surfaces of the photoconductive drums 102, are transferred to the transfer belt 101 one above the other to form the full-color toner image. The full-color toner image formed on the transfer belt 101 is conveyed to a transfer position between a transfer roller 104 and a sheet transfer path (indicated by the doted line). At the transfer portion, the full-color toner image is transferred from the transfer belt 101 to the recording sheet, which is transferred through the sheet transfer path by a plurality of transferring rollers.

The recording sheet having the full-color toner image formed thereon is further conveyed to a fixing roller 105. The fixing roller 105, together with a pressure roller, fixes the toner image onto the recording sheet by heat and pressure. The recording sheet is further conveyed to the inspection apparatus 202.

In case of printing double-sided images, the recording sheet having one side with the fixed toner image is conveyed to a switchback path 106, and transferred back to the transfer roller 104 to receive another image on the other side of the recording sheet. The recording sheet, after being fixed at the fixing roller 105, may be then conveyed to the inspection apparatus 202. To make inspection easier, in this example, it is assumed that the single-sided printed image is conveyed to the inspection apparatus 202. However, in case of inspecting the respective sides of the recording sheet, the inspection apparatus 202 may further include one more image reading device 1.

The inspection apparatus 202 reads out the surface of the recording sheet having the printed image, which is conveyed from the print engine 201 through the sheet transfer path, to generate a read image, using the image reading device 1 of FIG. 1. The inspection apparatus 202 obtains image data, which is used by the print engine 201 to form the toner image that is subjected for reading, to generate a master image. The inspection device 202 compares between the read image and the master image to output an inspection result.

The recording sheet, read by the image reading device 1, is further conveyed to the stacker 203. The stacker 203 stacks the recording sheet conveyed from the inspection apparatus 202 onto a tray 204.

By incorporating the image reading device I into the inspection apparatus 202, the printed image may be read with improved accuracy, while simplifying the calibration process of the optical sensor.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in an image reading device capable of calibrating a correction value to be used for correcting a reading result of an imaging element. The image reading device includes: an imaging device including a plurality of imaging elements; a color measuring unit that detects the light level of the incident light by wavelength range to obtain the measured colors; a calibrator having a surface on which a plurality of color patches to be read in the process of calibrating the imaging device is formed, the calibrator being provided so as to be movable along the arrangement of the imaging elements of the imaging device; and a controller, such as a processor, that controls the process of measuring the colors using the color measuring unit and the process of calibrating using the calibrator. In the process of measuring the colors, the controller controls the relative position of the imaging device and the calibrator such that the plurality of color patches are read by the color measuring unit. The controller moves at least one of the imaging device or the calibrator at a speed such that a time period required for a color measurement area to move through the inside of one color patch is equal to or greater than a color measurement time period of the color measurement unit. The controller generates reference values to be used for the calibration process based on the measurement results obtained by the color measurement unit for the plurality of color patches. In the calibration process, the controller controls the relative position of the imaging device and the calibrator such that the plurality of color patches are read by the imaging device. The controller compares the reading results of the plurality of colors patches, with the reference values, to generate correction values to be used for correcting the reading results of the plurality of color patches.

In the above-described example, the controller stores the reference values generated in the process of measuring the colors in a memory. The controller compares, for a specific color patch, between the newly generated reference values and the previously stored reference values to generate a comparison result indicating the difference. Based on the comparison result, the controller determines whether there is any trouble in color patch.

In the above-described example, the color measuring unit is provided along a line extending from the direction along which the plurality of imaging elements is arranged.

What is claimed is:

1. An image reading device, comprising:
    an imaging device including a plurality of imaging elements arranged in line in a main scanning direction;
    a color measuring unit configured to detect a level of light reflected from an object at a color measurement area to output an electric signal reflecting color of the object;
    a calibration plate having a surface on which a plurality of color patches is formed;
    a driving mechanism to drive the calibration plate to move in a direction parallel to the main scanning direction; and
    a processor configured to:
        instruct the driving mechanism to move the calibration plate against the imaging device, and instruct the color measuring unit to read the plurality of color patches while the calibration plate is moved in the direction parallel to the main scanning direction against the imaging device, to output color measurement results of the plurality of color patches;

generate a set of reference values for the plurality of color patches based on the color measurement results of the plurality of colors;

cause the imaging device to read the plurality of color patches while changing a relative position between the plurality of color patches and the plurality of imaging elements, to output reading results of the plurality f color patches;

compare the reading results of the plurality of color patches, with the set of reference values for the plurality of color patches, to generate a comparison result; and generate a set of correction values based on the comparison result, the set of correction values being used for correcting the reading results of the plurality of color patches.

2. The image reading device of claim 1, further comprising:
a memory configured to store the set of reference values for the plurality of color patches as previously obtained reference values, wherein the processor is further configured to,
generate a new set of reference values based on color measurement results of the color measuring unit as newly obtained reference values,
compare, for at least one of the plurality of color patches, between the previously obtained reference value and the newly obtained reference value to generate a comparison result indicating the difference, and
detect an error n color measurement unit or color patch based on the difference.

3. The image reading device of claim 1, wherein the color measuring unit is disposed along a line extending from the line through which the plurality of imaging elements is arranged.

4. An inspection apparatus, comprising at least one image reading device of claim 1.

5. An image reading device, comprising:
an imaging device including a plurality of imaging elements arranged in line;
a color measuring unit configured to detect a level of light reflected from an object at a color measurement area to output an electric signal reflecting color of the object;
a calibration plate having a surface on which a plurality of color patches is formed; and
a processor configured to:
cause the color measuring unit to read the plurality of color patches while changing a relative position between the plurality of color patches and the plurality of imaging elements, to output color measurement results of the plurality of color patches;
generate a set of reference values for the plurality of color patches based on the color measurement results of the plurality of colors;
cause the imaging device to read the plurality of color patches while changing a relative position between the plurality of color patches and the plurality of imaging elements, to output reading results of the plurality of color patches;
compare the reading results of the plurality of color patches, with the set of reference values for the plurality of color patches, to generate a comparison result;

generate a set of correction values based on the comparison result, the set of correction values being used for correcting the reading results of the plurality of color patches; and
cause the calibration plate to be moved along the line through which the purality of imaging elements is arranged, at a speed such that a time period required for the color measurement area to change the position thereof to travel through the inside of one patch is equal to or greater than a time period required for the color measuring unit to complete reading the color of one patch.

6. The image reading device of claim 5, further comprising:
a memory configured to store the set of reference values for the plurality of color patches as previously obtained reference values, wherein the processor is further configured to,
generate a new set of reference values based on color measurement results of the color measuring unit as newly obtained reference values,
compare, for at least one of the plurality of color patches, between the previously obtained reference value and the newly obtained reference value to generate a comparison result indicating the difference, and
detect an error in color measurement unit or color patch based on the difference.

7. The image reading device of claim 5, wherein the color measuring unit is disposed along a line extending from the line through which the plurality of imaging elements is arranged.

8. An inspection apparatus, comprising at least one image reading device of claim 5.

9. A method of controlling an image reading device, the image reading device provided with an imaging device including a plurality of imaging elements arranged in line, a color measuring unit configured to detect a level of light reflected from an object at a color measurement area to output an electric signal reflecting color of the object, and a calibration plate having a surface on which a plurality of color patches is formed, the method comprising:
causing the color measuring unit to read the plurality of color patches while changing a relative position between the plurality of color patches and the plurality of imaging elements, to output color measurement results of the plurality of color patches;
generating a set of reference values for the plurality of color patches based on the color measurement results of the plurality of colors;
causing the imaging device to read the plurality of color patches while changing a relative position between the plurality of color patches and the plurality of imaging elements, to output reading results of the plurality of color patches;
comparing the reading results of the plurality of color patches, with the set of reference values for the plurality of color patches, to generate a comparison result;
generating a set of correction values based on the comparison result, the set of correction values being used for correcting the reading results of the color patches; and
causing the calibration plate to be moved along the line through which the plurality of imaging elements is arranged, at a speed such that a time period required for the color measurement area to change the position thereof to travel through the inside of one patch is equal to or greater than a time period required for the color measuring unit to complete reading the color of one patch.

10. The method of claim 9, further comprising:
   storing the set of reference values for the plurality of color patches in a memory as previously obtained reference values;
   generating a new set of reference values based on color measurement results of e color measuring unit as newly obtained reference values;
   comparing, for at least one of the plurality of color patches, between the previously obtained reference value and the newly obtained reference value to generate a comparison result indicating the difference; and
   detecting an error in color measurement unit or color patch based on the difference.

11. The method of claim 9, wherein the color measuring unit is disposed along a line extending from the line through which the plurality of imaging elements is arranged, the method further comprising:
   moving the calibration plate in a range covering at least the line through which the plurality of imaging elements is arranged and the line along which the color measuring unit is disposed.

12. A non-transitory recording medium storing a plurality of instructions which, when executed by a processor, cause the processor to perform a method of controlling an image reading device, the image reading device provided with an imaging device including a plurality of imaging elemets arranged in line, a color measuring units comfigured to detect a level of light reflected from an object at a color measurement area to output an electric signal reflecting color of the object, and a calibration plate having a surface on which a plurality of color patches is formed, the method comprising:
   causing the color measuring unit to read the plurality of color patches while changing a relative position between the plurality of color patches and the plurality of imaging elements, to output color measurement results of the plurality of color patches;
   generating a set of reference values for the plurality of color patches based on the color measurement results of the plurality of colors;
   causing the imaging device to read the plurality of color patches while changing a relative position between the plurality of color patches and the plurality of imaging elements, to output reading results of the plurality of color patches;
   comparing the reading results of the plurality of color patches, with the set of reference values for the plurality of color patches, to generate a comparison result;
   generating a set of correction values based on the comparison result, the set of correction values bein used for correcting the reading results of the plurality color patches; and
   causing the calibration plate to be moved along he line through which the plurality of imaging elements is arranged, at a speed such that a time period required for the color measurement area to move through the inside of one patch is equal to or greater than a time period required for the color measuring unit to complete reading the color of one patch.

* * * * *